Jan. 7, 1930.    J. M. BARR    1,742,182
DYNAMO ELECTRIC MACHINE STATOR
Filed Dec. 12, 1923
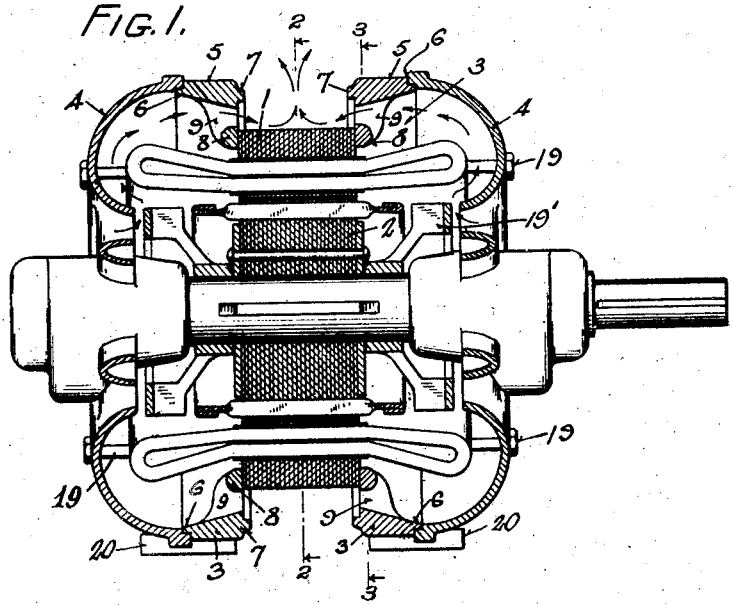
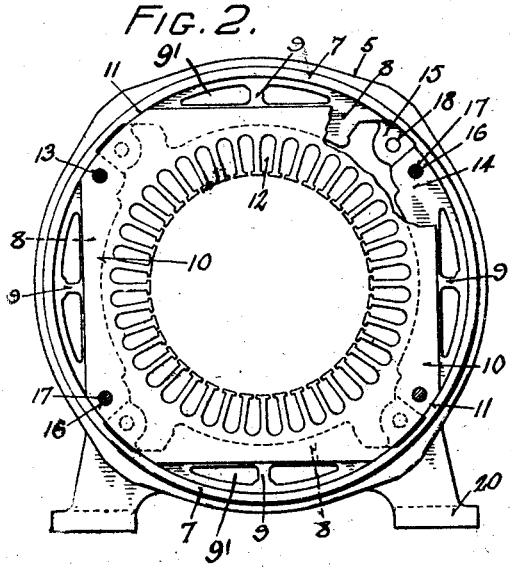
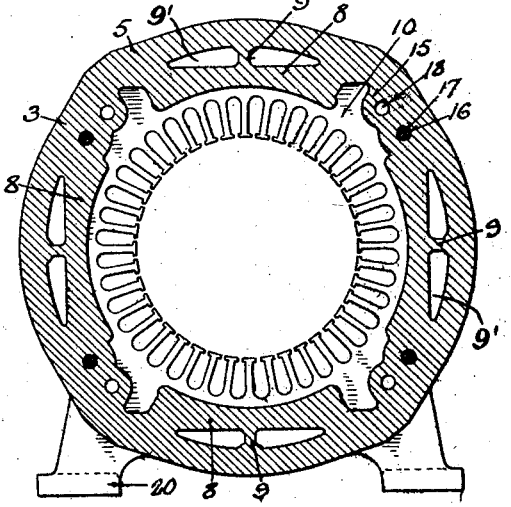
INVENTOR.
John M. Barr
BY
Edwin B. H. Tower, Jr.
ATTORNEY.

Patented Jan. 7, 1930

1,742,182

UNITED STATES PATENT OFFICE

JOHN M. BARR, OF MILWAUKEE, WISCONSIN, ASSIGNOR TO THE LOUIS ALLIS COMPANY, OF MILWAUKEE, WISCONSIN, A CORPORATION OF WISCONSIN

DYNAMO-ELECTRIC-MACHINE STATOR

Application filed December 12, 1923. Serial No. 680,161.

This invention relates to a dynamo electric machine stator.

The stator to which the invention applies in particular has separate end frames, a core arranged between the frames and provided with a central opening for the rotor, and an end casing carried on each end frame and provided with a bearing for the rotor shaft.

An object of the invention is to facilitate ventilating the stator and cooling the core thereof.

Another object is to provide a stator which is strong, durable and compact, and which may be readily and economically manufactured.

According to the invention, each end frame is provided with passages to discharge air from within the stator and direct it inwardly onto the core.

The stator set forth herein is a modification of the invention set forth and claimed in Patent No. 1,681,915, Serial No. 680,160, filed December 12, 1923 and Patent No. 1,681,916, Serial No. 693,615, filed February 18, 1924.

A stator embodying the invention is shown in the accompanying drawing in which the views are as follows:

Fig. 1 is a longitudinal section through a dynamo electric machine showing the stator in assembled position.

Fig. 2 is a section through the stator on line 2—2 of Fig. 1.

Fig. 3 is a section through the stator on line 3—3 of Fig. 1.

A dynamo electric machine in which the stator may be employed has a stator core 1, a rotor 2, and supporting means therefor.

The stator is supported by end frames 3, and the rotor is supported by end casings 4 which are carried by the end frames.

Each end frame 3 has a circular peripheral portion 5 having an outward lateral flange 6 to receive the end casing 4 and an inward lateral flange 7 to receive the corners of the stator core.

The faces of the stator core 1 are engaged by bar members 8 which are joined at the ends thereof to the peripheral portion 5 and may also be joined intermediate the ends to the peripheral portion 5 by webs 9.

The spaces between the members 8 and the peripheral portion 5 form air passages 9' through which air is exhausted from the interior of the machine.

The outer walls of the air passages 9' are inclined to the radii of the end frames so as to direct the discharged air onto the periphery of the core 1, as indicated by the arrows in Fig. 1.

The stator core laminæ 10 are formed from sheet metal and have rounded corners 11, winding slots 12 and apertures 13 which may be formed simultaneously to insure perfect alinement.

The corners 11, the flanges 6 and 7, and the parts of the end casings 4 which engage the flanges 6 are all concentric with the axis of the machine so that the stator core 1, end frames 3 and end casings 4 are automatically brought into correct alinement when the machine is assembled.

The end frames 3 are provided with lugs 14 and 15 to carry the rivets or bolts which fasten the end casings 4, end frames 3 and core 1 together.

The lugs 14 have apertures 16 to receive rivets or bolts 17 which pass through the apertures 13 in the laminæ 10 and fasten the end frames 3 and the stator core 1 together.

The lugs 15 have threaded apertures 18 to receive the threaded ends of bolts 19 which fasten the end casings 4 to the end frames 3.

Each aperture 16 is preferably arranged close to an aperture 18 so that there is little leverage between the rivets 17 and the bolts 19.

The rotor shaft carries fans 19' which draw air through openings in the end casings 4 and force the same around the stator windings, through the openings 9', and against the periphery of the stator core, as indicated by the arrows in Fig. 1.

The machine is supported by standards 20 which are carried by the end frames 3.

The invention herein set forth is susceptible of various modifications without departing from the scope thereof as hereafter claimed.

What I claim is:

1. A dynamo electric machine stator comprising a core, and end frames having substantially continuous engagement with said core and provided with radially inclined passages to direct discharged air inwardly onto said core.

2. A dynamo electric machine stator comprising a substantially square core, end frames therefor having substantially continuous engagement with said core and provided with radially inclined passages to direct discharged air inwardly onto said core, and end casings carried by said end frames.

3. A dynamo electric machine stator comprising a core, and end frames having inward lateral flanges to hold the same and said core in alinement and provided with radially inclined passages to direct discharged air inwardly onto said core.

4. A dynamo electric machine stator comprising a substantially square core having corners concentric with its pole face, and end frames having inward lateral flanges to engage said core at the corners thereof and provided with radially inclined passages to direct discharged air inwardly onto said core.

5. A dynamo electric machine stator comprising a core, end frames having substantially continuous engagement with said core and provided with radially inclined passages to direct discharged air inwardly onto said core, and inward lateral flanges formed on said frames to engage said core.

6. A dynamo electric machine stator comprising a substantially square core having corners concentric with its pole face, end frames having inward lateral flanges to engage said core at the corners thereof and provided with radially inclined passages to direct discharged air inwardly onto said core, and end casings carried by said frames.

7. A dynamo electric machine stator comprising a core, end frames having substantially continuous engagement with said core and provided with radially inclined passages to direct discharged air inwardly onto said core, inward lateral flanges formed on said frames to engage said core, and end casings carried by said frames.

In witness whereof, I have hereunto subscribed my name.

JOHN M. BARR.